United States Patent
Zhao et al.

(10) Patent No.: US 10,748,233 B2
(45) Date of Patent: Aug. 18, 2020

(54) FULL SCREEN PROCESSING IN MULTI-APPLICATION ENVIRONMENTS

(75) Inventors: Tao Zhao, Shanghai (CN); John C. Weast, Portland, OR (US); Brett P. Wang, Shanghai (CN)

(73) Assignee: Intel Corporation, Santa Clara, CA (US)

( * ) Notice: Subject to any disclaimer, the term of this patent is extended or adjusted under 35 U.S.C. 154(b) by 2322 days.

(21) Appl. No.: 13/578,355

(22) PCT Filed: Jun. 11, 2011

(86) PCT No.: PCT/CN2011/000982
§ 371 (c)(1),
(2), (4) Date: Aug. 10, 2012

(87) PCT Pub. No.: WO2012/171137
PCT Pub. Date: Dec. 20, 2012

(65) Prior Publication Data
US 2019/0197650 A1   Jun. 27, 2019

(51) Int. Cl.
| G06T 1/20 | (2006.01) |
| G06F 9/00 | (2006.01) |
| G06F 9/48 | (2006.01) |
| G06F 9/451 | (2018.01) |

(52) U.S. Cl.
CPC .............. *G06T 1/20* (2013.01); *G06F 9/451* (2018.02); *G06F 9/485* (2013.01); *G06F 9/4881* (2013.01)

(58) Field of Classification Search
CPC .......... G06T 1/20; G06F 9/451; G06F 9/4881
USPC ...................................................... 345/501
See application file for complete search history.

(56) References Cited

U.S. PATENT DOCUMENTS

| 2005/0068169 A1* | 3/2005 | Copley | G08B 21/0283 340/539.13 |
| 2006/0282253 A1* | 12/2006 | Buswell | G06F 3/1454 703/22 |
| 2007/0106954 A1* | 5/2007 | Porter | G06F 3/0481 715/781 |
| 2009/0322764 A1* | 12/2009 | Saini | G06T 1/20 345/501 |
| 2010/0315564 A1* | 12/2010 | Hung | G06F 9/485 348/739 |
| 2012/0198319 A1* | 8/2012 | Agnoli | G06F 9/4843 715/202 |

FOREIGN PATENT DOCUMENTS

| CN | 101266556 A | 9/2008 |
| CN | 101673216 A | 3/2010 |

OTHER PUBLICATIONS

Zhao, et al. "A high performance method for multiple native application UI composition in Intel CE SoC", U.S. Appl. No. 13/000,356, field Oct. 5, 2010, 16 pages.

(Continued)

*Primary Examiner* — Hai Tao Sun
(74) *Attorney, Agent, or Firm* — Jordan IP Law, LLC (57) ABSTRACT

Systems and methods for determining a foreground application and at least one background application from multiple graphics applications executing within an execution environment are disclosed. Pixel data rendered by the foreground application may be displayed in the execution environment while a rendering thread of the background application may be paused.

20 Claims, 6 Drawing Sheets

(56) References Cited

OTHER PUBLICATIONS

Segal, et al., "The OpenGLR Graphics System: A Specification", (Version 4.1 Core Profile), Jul. 25, 2010, pp. 518.
International Search Report and Written Opinion Received for PCT Patent Application No. PCT/CN2011/000982, dated Mar. 8, 2012, 10 pages.

* cited by examiner

FULL SCREEN PROCESSING IN MULTI-APPLICATION ENVIRONMENTS

BACKGROUND

Various graphics software applications may be utilized by different digital/electronic systems to render graphical scenes. In some cases, multiple graphics software applications may run in the same execution environment or system. In a multi-application execution environment such as a multi-application framework (MAF) environment, multiple native application user interfaces (UIs) may need to be composed to create a designated user experience. In MAF full screen mode a particular application may be selected and brought to the foreground while remaining applications except the UI framework render to off-screen surfaces and these surfaces are redirected to the UI framework for final output.

However, compared with an application rendering natively directly to screen, such full screen mode processing may consume more hardware (HW) resources than desirable for cross process rendering and UI compositing purposes. For instance, a graphics core, such as an embedded Graphics Processing Unit (GPU), may generally support only one execution thread. To support multiple applications, a typical GPU may time slice between rendering applications regardless of whether those applications are rendering on screen or off screen. As a result, in a conventional MAF environment, even if only one of multiple rendering applications is rendering on screen, that application benefits from only a fraction of the GPU's rendering capacity. To better effect on screen rendering, a typical MAF environment may shut down all other rendering processes to permit an on screen rendering process sole access to GPU resources.

BRIEF DESCRIPTION OF THE DRAWINGS

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. In the figures.

DETAILED DESCRIPTION

One or more embodiments are now described with reference to the enclosed figures. While specific configurations and arrangements are discussed, it should be understood that this is done for illustrative purposes only. Persons skilled in the relevant art will recognize that other configurations and arrangements may be employed without departing from the spirit and scope of the description. It will be apparent to those skilled in the relevant art that techniques and/or arrangements described herein may also be employed in a variety of other systems and applications other than what is described herein.

While the following description sets forth various implementations that may be manifested in architectures such system-on-a-chip (SoC) architectures for example, implementation of the techniques and/or arrangements described herein are not restricted to particular architectures and/or computing systems and may implemented by any architecture and/or computing system for similar purposes. For instance, various architectures employing, for example, multiple integrated circuit (IC) chips and/or packages, and/or various computing devices and/or consumer electronic (CE) devices such as set top boxes, smart phones, etc., may implement the techniques and/or arrangements described herein. Further, while the following description may set forth numerous specific details such as logic implementations, types and interrelationships of system components, logic partitioning/integration choices, etc., claimed subject matter may be practiced without such specific details. In other instances, some material such as, for example, control structures and full software instruction sequences, may not be shown in detail in order not to obscure the material disclosed herein.

The material disclosed herein may be implemented in hardware, firmware, software, or any combination thereof. The material disclosed herein may also be implemented as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

References in the specification to "one implementation", "an implementation", "an example implementation", etc., indicate that the implementation described may include a particular feature, structure, or characteristic, but every implementation may not necessarily include the particular feature, structure, or characteristic. Moreover, such phrases are not necessarily referring to the same implementation. Further, when a particular feature, structure, or characteristic is described in connection with an implementation, it is submitted that it is within the knowledge of one skilled in the art to effect such feature, structure, or characteristic in connection with other implementations whether or not explicitly described herein.

Figure 1:
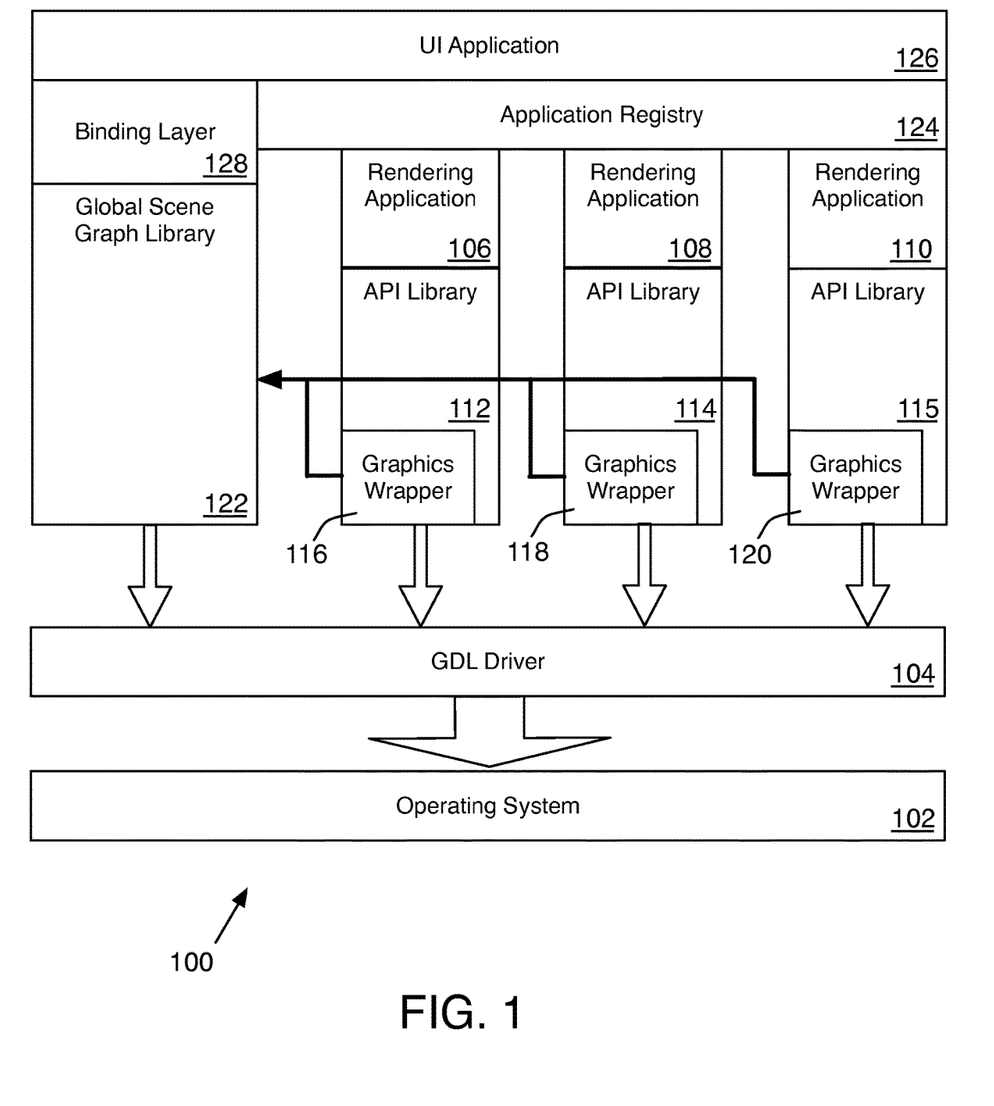
FIG. 1 is an illustrative diagram of an example execution environment.

Material described herein may be implemented in the context of a multi-application execution environment hereinafter referred to as a Multiple Application Framework (MAF) that permits the compositing of multiple application UIs for graphical display. FIG. 1 illustrates a MAF environment 100 in accordance with the present disclosure. Environment 100 may be implemented in hardware, software, firmware or any combination thereof. For example, environment may be implemented, at least in part, by software and/or firmware instructions executed by or within a computing system such as a CE system employing a SoC architecture.

Environment 100 includes an operating system (OS) 102 that may be stored in memory (not shown). OS 102 may be of any type and may be operably and/or communicatively coupled to or with a graphics device library (GDL) driver 104. In various implementations, GDL driver 104 may be, by way of non-limiting example, a rendering application or program that may be executed by system hardware (not shown).

Environment 100 further includes multiple graphics or rendering applications 106, 108 and 110. In various implementations, rendering applications 106, 108 and/or 110 may include one or more rendering functions and may communicate with other software such as GDL driver 104. By way of non-limiting example, application 106 may be a DirectFB application (see, e.g., DirectFB version 1.4.11, released Nov. 15, 2010), application 108 may be an OpenGL ES application (see, e.g., OpenGL Specification version 4.1, published Jul. 25, 2010), and application 110 may represent one or more rendering applications such as Simple DirectMedia Layer (SDL) or the like. In various implementations, applications 106, 108 and 110 may be associated with respective application programming interface (API) engines or libraries 112, 114 and 115. Further, in various implementations, applications 106, 108 and 110 and/or API libraries 112, 114 and 115 may be associated with corresponding software agents or graphics wrappers 116, 118 and 120. For instance, by way of non-limiting example, application 106 may be a DirectFB rendering application and may include a DirectFB API library 112 and a DirectFB wrapper 116 while application 108 may be a OpenGL ES rendering application and may include a OpenGL ES API library 114 and a OpenGL ES wrapper 118.

In various implementations, any of rendering API agents or wrappers 116, 118 and 120, such as wrapper 116, may act within a rendering API library, such as API library 112, to change a on-screen rendering output to off-screen and to provide associated memory surface information to other entities as will be described in greater detail below. Those of skill in the art will recognize that a memory surface may be implemented in a memory buffer and may contain pixel information or data. Environment 100 further includes an application/surface management component or Global Scene Graph Library (GSGL) 122 operably and/or communicatively coupled to wrappers 116, 118 and 120. In various implementations, GSGL 122 may host all underlying memory surfaces and may communicate with wrappers 116, 118 and 120 using well known inter process communication methods. In response to communications from GSGL 122, wrappers 116, 118 and/or 120 may cause the rendering output of respective applications 106, 108 and/or 110 to switch between on-screen or off-screen memory surfaces.

In various implementations, environment 100 further includes an application registry 124 to maintain information about and to manage applications 106, 108 and/or 110. Environment 100 further includes a rendering service application or UI application 126 to composite off-screen output from applications 106, 108 and 110, and to display a final UI on a display screen (not shown). UI application 126 may also act to determine, at least in part, whether a particular application's output should be provided to an on-screen memory surface or to an off-screen memory surface. UI application 126 may obtain application information and/or memory surface information from registry 124. In some implementations, environment 100 may include a binding library or layer 128 to transform underlying memory surfaces to various rendering API surfaces. In various implementations, binding layer 128 may implement Clutter Binding or any other graphics engines such as OpenGL ES or Qt.

Figure 2:
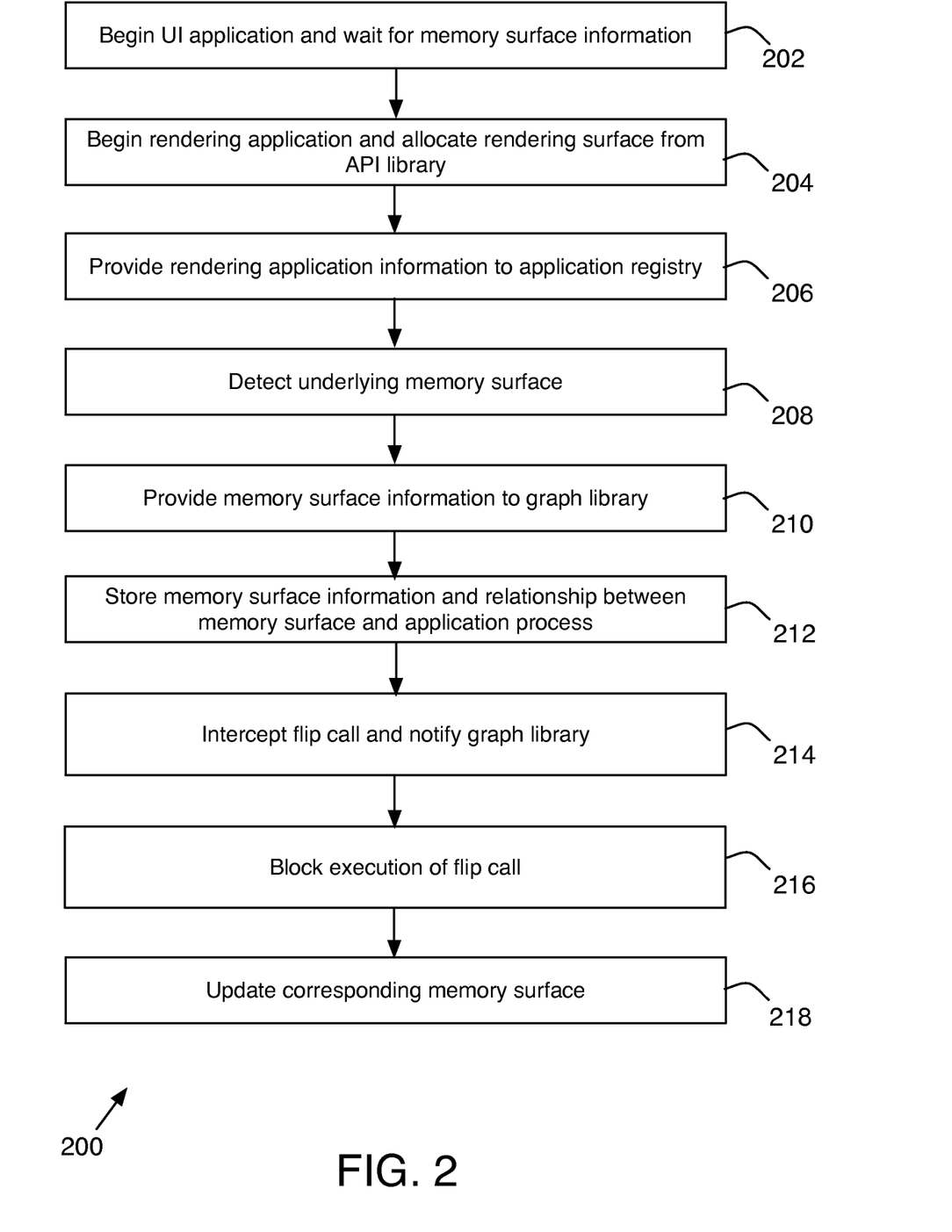
FIG. 2 illustrates an example process.

FIG. 2 illustrates a flow diagram of an example process 200 according to various implementations of the present disclosure. Process 200 may include one or more operations, functions or actions as illustrated by one or more of blocks 202, 204, 206, 208, 210, 212, 214, 216, and 218. While, by way of non-limiting example, process 200 will be described herein in the context of example environment 100 of FIG. 1, those skilled in the art will recognize that process 200 may be implemented in various other execution environments. Process 200 may begin at block 202.

At block 202, a UI application may be started and the UI application may wait to receive memory surface information. For example, UI application 126 may begin at block 202 and may wait to receive memory surface information regarding one or more of applications 106, 108 and/or 110. At block 204, a rendering application may be started and the rendering application may allocate a memory surface from an API library. For instance, application 108 may begin at block 204 and may allocate a memory surface from API library 114. At block 206, the application may provide rendering application information to an application registry. For example, at block 206, application 108 may provide rendering application information to application registry 124 where that application information includes information identifying the rendering application such as process name, process identification number, etc. At block 208, the underlying memory surface may be detected. For instance, at block 208, wrapper 118 associated with API library 114 and application 108 may detect the memory surface allocated at block 204 by application 108.

Process 200 may continue at block 210 where memory surface information may be provided to a graph library. For example, at block 210, wrapper 118 may provide application information including information identifying the allocated memory surface to GSGL 122. The memory surface information may also include information specifying the relationship between that memory surface and the rendering process such as how the allocated memory surface is ordered with respect to other memory surfaces the rendering application may be using, the location of the allocated memory surface in memory, and so forth. At block 212 the memory surface information and information specifying the relationship between that surface and the corresponding application process may be stored. For instance, at block 212, GSGL 122 may store the memory surface information provided in block 210 and may also store information specifying the relationship between that memory surface and the rendering process of application 108.

Process 200 may continue at block 214 where a flip call may be intercepted and the graph library may be notified of the flip call. For example, at block 214, wrapper 118 may intercept a flip call (e.g., a gdl_flip( ) call) that may result from rendering by application 108 and wrapper 118 may notify GSGL 122 that wrapper 118 has intercepted a flip call. As those skilled in the art may recognize, a flip call such as gdl_flip( ) may occur when a graphics application switches from rendering to a background or off-screen memory surface to rendering to a foreground or on-screen memory surface or vice versa. At block 216 execution of the flip call may be blocked. For instance, at block 216, wrapper 118 may block execution of the flip call intercepted at block 214. In various implementations, block 216 may include, for example, blocking the transfer of pixel data from an internal application buffer to a physical display device.

Process 200 may conclude at block 218 where the memory surface information may be updated. For example, at block 218, GSGL 122 may, in response to the notification provided at block 214, update the memory surface information previously stored at block 218 to indicate that a flip call associated with application 108 has been intercepted and/or to identify, of the memory surfaces used by application 108, the memory surface(s) are affected by the flip call. While the implementation of example process 200, as illustrated in FIG. 2, may include the undertaking of all of blocks 202-218 in the order illustrated, claimed subject matter is not limited in this regard and, in various examples, implementation of process 200 may include the undertaking only a subset of blocks 202-218 and/or in a different order than illustrated.

Figure 3:
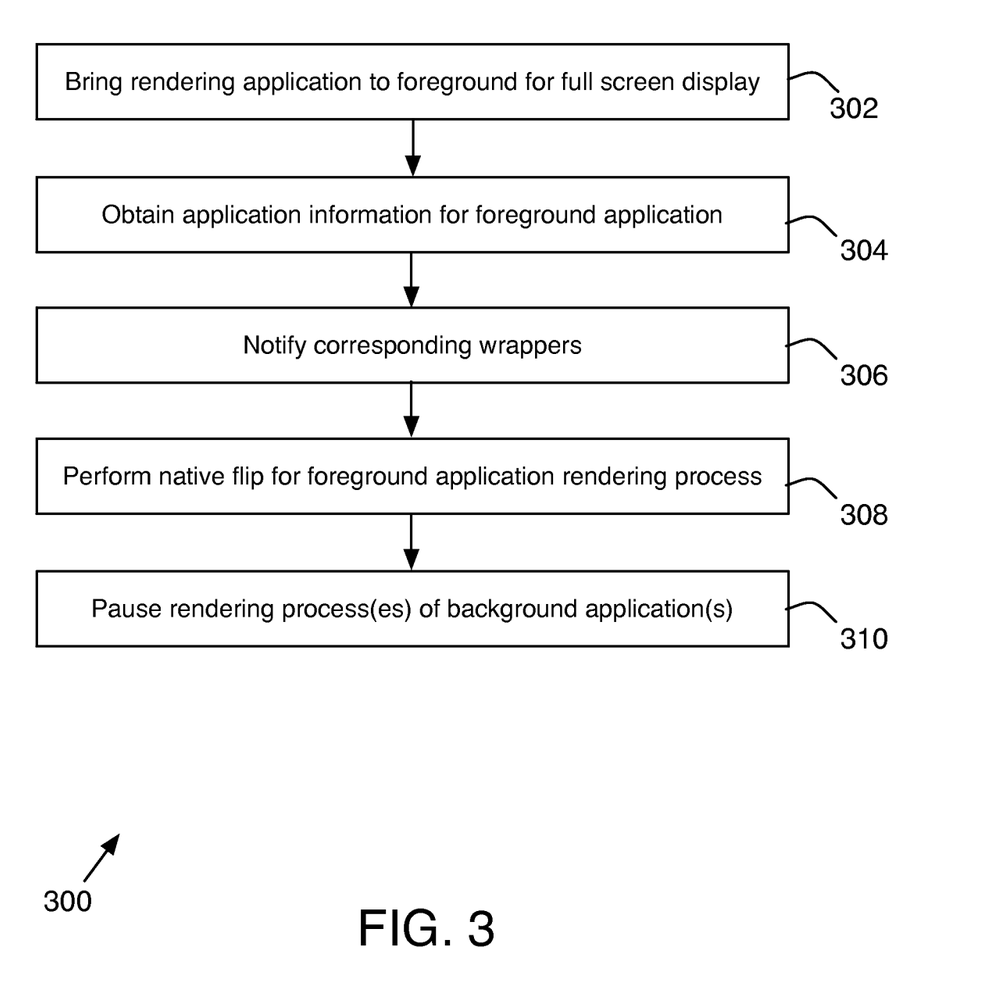
FIG. 3 illustrates an example process.

FIG. 3 illustrates a flow diagram of an example process 300 according to various implementations of the present disclosure. Process 300 may include one or more operations, functions or actions as illustrated by one or more of blocks 302, 304, 306, 308, and 310. While, by way of non-limiting example, process 300 will be described herein in the context of example environment 100 of FIG. 1, those skilled in the art will recognize that process 300 may be implemented in various other execution environments. Process 300 may begin at block 302.

At block 302 a rendering application may be brought to the foreground for full screen display and, at block 304, application information may be obtained for the foreground application. For instance, referring to process 200 of FIG. 2, block 302 may occur after a flip call is intercepted and corresponding memory surface information is updated at blocks 214-218. Thus, block 302 may involve bringing the rendering output of the application that issued the flip call at block 214 to the foreground for full screen display. For example, block 302 may involve UI application 126 bringing application 108 to the foreground for full screen rendering. UI application 126 may then undertake block 304 by obtaining application information corresponding to application 108 from application registry 124. At block 306, corresponding wrappers may be notified. For instance, UI application 126 may undertake block 306 by requesting that GSGL 122 provide instructions to wrappers 116, 118 and 120 where those instructions may specify that the rendering output of application 108 is to be processed for foreground rendering while applications 106 and 110 are to be treated as background applications.

Process 300 may continue at block 308 where a native flip may be performed for the foreground application while, at block 310, the rendering process(es) of the background application(s) may be paused. For example, in response to an instruction provided by GSGL 122 at block 306, wrapper 118 may undertake block 308 by routing application 108's rendering process to a direct flip, while, also in response to instructions provided by GSGL 122 at block 306, wrappers 116 and 120 may undertake block 310 by pausing the rendering threads of respective applications 106 and 110. In various implementations, when performing a native flip at block 308, a rendering application such as application 108 may be allowed direct access to physical hardware planes and/or display devices such that intermediate compositing of rendered output may not be required. Further, when implementing block 310, wrappers 116 and 120 may also block flip calls from respective applications 106 and 110 and wait for further notification from GSGL 122.

While the implementation of example process 300, as illustrated in FIG. 3, may include the undertaking of all of blocks 302-310 in the order illustrated, claimed subject matter is not limited in this regard and, in various examples, implementation of process 300 may include the undertaking only a subset of blocks 302-310 and/or in a different order than illustrated. Thus, for example, in various implementations process 300 may involve undertaking blocks 308 and 310 substantially in parallel or may involve undertaking block 310 prior to undertaking block 308, etc.

Figure 4:
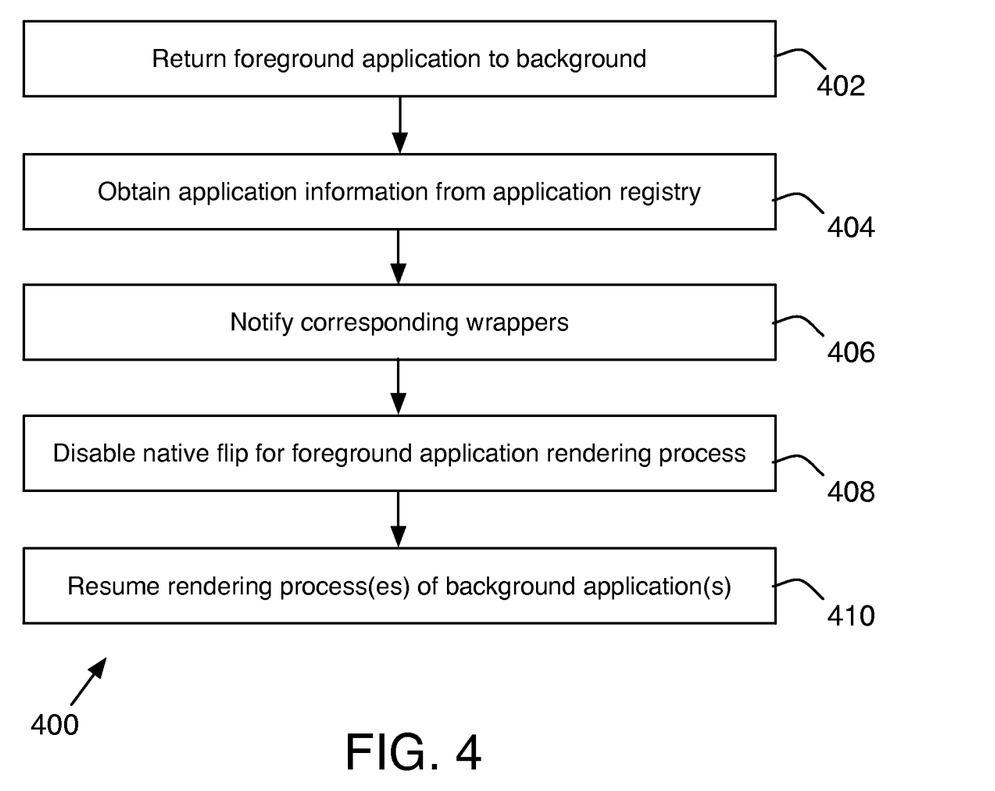
FIG. 4 illustrates an example process.

FIG. 4 illustrates a flow diagram of an example process 400 according to various implementations of the present disclosure. Process 400 may include one or more operations, functions or actions as illustrated by one or more of blocks 402, 404, 406, 408, and 410. While, by way of non-limiting example, process 400 will be described herein in the context of example environment 100 of FIG. 1, those skilled in the art will recognize that process 400 may be implemented in various other execution environments. Process 400 may begin at block 402.

At block 402 a foreground application may be returned to the background and, at block 404, application information may be obtained from an application registry. For example, UI application 126 may undertake block 402 by sending application 108 to the background and may undertake block 404 by obtaining application information corresponding to application 108 from application registry 124. At block 406, corresponding wrappers may be notified. For instance, UI application 126 may undertake block 406 by requesting that GSGL 122 provide instructions to wrappers 116, 118 and 120.

Process 400 may continue at block 408 where a native flip may be disabled for the foreground application while, at block 410, the rendering process(es) of the background application(s) may be resumed. For example, in response to an instruction provided by GSGL 122 at block 406, wrapper 118 may undertake block 408 by inhibiting application 108's rendering process from making a flip call and by routing the rendering to an off-screen memory surface. Further, and also in response to instructions provided by GSGL 122 at block 406, wrappers 116 and 120 may, for example, undertake block 410 by resuming the rendering threads of respective applications 106 and 110.

While the implementation of example process 400, as illustrated in FIG. 4, may include the undertaking of all of blocks 402-410 in the order illustrated, claimed subject matter is not limited in this regard and, in various examples, implementation of process 400 may include the undertaking only a subset of blocks 402-410 and/or in a different order than illustrated. Thus, for example, in various implementations process 400 may involve undertaking blocks 408 and 410 substantially in parallel or may involve undertaking block 410 prior to undertaking block 408, etc.

Figure 5:
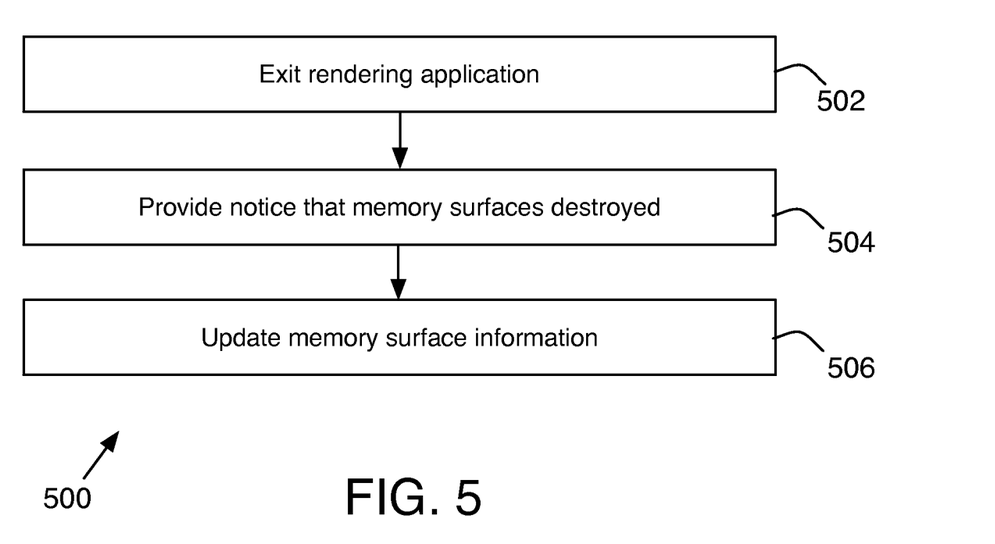
FIG. 5 illustrates an example process.

FIG. 5 illustrates a flow diagram of an example process 500 for full screen application processing in a multi-application environment according to various implementations of the present disclosure. Process 500 may include one or more operations, functions or actions as illustrated by one or more of blocks 502, 504 and 506. While, by way of non-limiting example, process 500 will be described herein in the context of example environment 100 of FIG. 1, those skilled in the art will recognize that process 500 may be implemented in various other execution environments. Process 500 may begin at block 502.

At block 502 a rendering application may exit. For example, application 108 may undertake block 502 by exiting execution. At block 504, notice may be provided that memory surfaces have been destroyed, and, at block 506, memory surface information may be updated. For instance, block 504 may involve wrapper 118, in response to application 108 exiting at block 502, notifying GSGL 122 that one or more memory surfaces used by application 108 have been destroyed. Block 506 may then include GSGL 122 updating memory surface information in response to the notice received from wrapper 118. While the implementation of example process 500, as illustrated in FIG. 5, may include the undertaking of all of blocks 502-506 in the order illustrated, claimed subject matter is not limited in this regard and, in various examples, implementation of process 500 may include the undertaking only a subset of blocks 502-506 and/or in a different order than illustrated.

Any one or more of the processes of FIGS. 2-5 may be undertaken in response to instructions provided by one or more computer program products. Such program products may include signal bearing media providing instructions that, when executed by, for example, a processor, may provide the functionality described above with respect to FIGS. 1-5. The computer program products may be provided in any form of computer readable medium. Thus, for example, a processor including one or more processor core(s) may undertake one or more of the blocks shown in FIGS. 2-5 in response to instructions conveyed to the processor by a computer readable medium.

Figure 6:
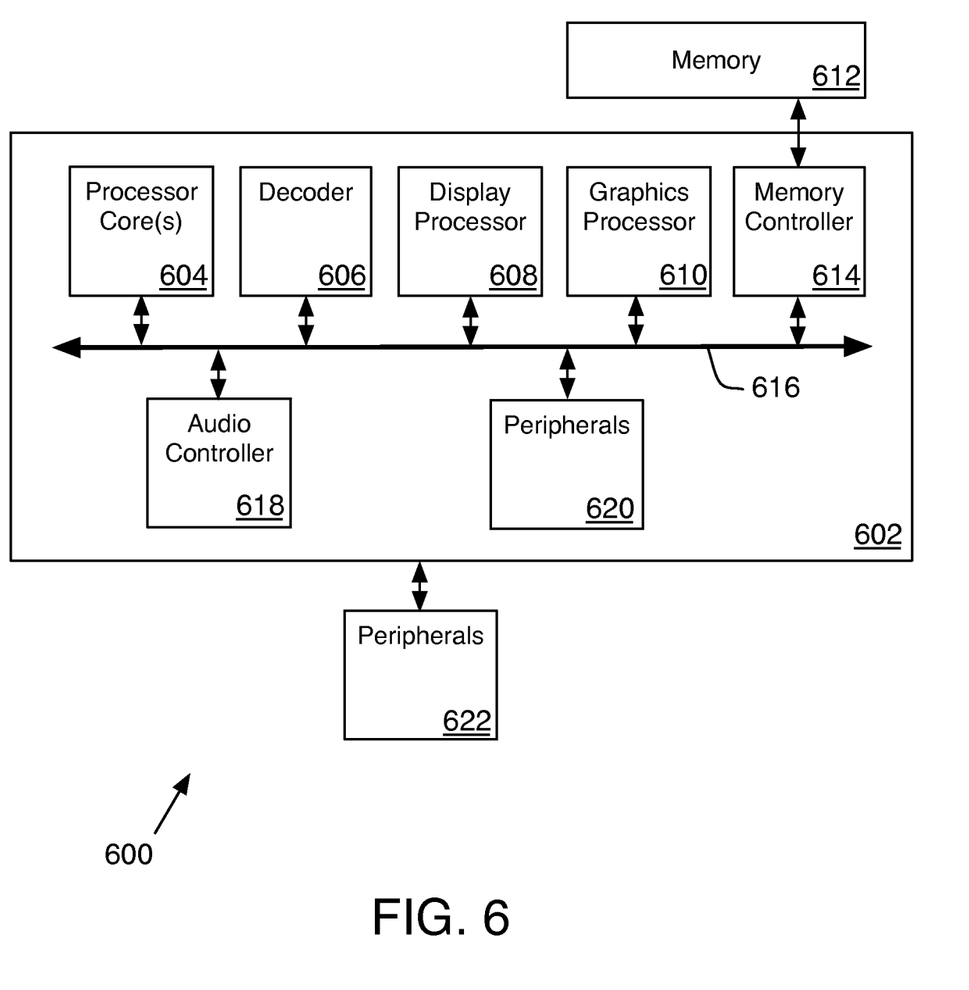
FIG. 6 is an illustrative diagram of an example system.

FIG. 6 illustrates an example system 600 in accordance with the present disclosure. System 600 may be used to perform some or all of the various functions discussed herein and may include any device or collection of devices capable of undertaking full screen application processing in a multi-application environment in accordance with various implementations of the present disclosure. For example, system 600 may include selected components of a computing platform or device such as a desktop, mobile or tablet computer, a smart phone, a set top box, etc., although the present disclosure is not limited in this regard. In some implementations, system 600 may be a computing platform or SoC based on Intel® architecture (IA) for CE devices. It will be readily appreciated by one of skill in the art that the implementations described herein can be used with alternative processing systems without departure from the scope of the present disclosure.

System 600 includes a processor 602 having one or more processor cores 604. Processor cores 604 may be any type of processor logic capable at least in part of executing software and/or processing data signals. In various examples, processor cores 604 may include a complex instruction set computer (CISC) microprocessor, a reduced instruction set computing (RISC) microprocessor, a very long instruction word (VLIW) microprocessor, a processor implementing a combination of instruction sets, or any other processor device, such as a digital signal processor or microcontroller.

Processor 602 also includes a decoder 606 that may be used for decoding instructions received by, e.g., a display processor 608 and/or a graphics processor 610, into control signals and/or microcode entry points. While illustrated in system 600 as components distinct from core(s) 604, those of skill in the art may recognize that one or more of core(s) 604 may implement decoder 606, display processor 608 and/or graphics processor 610. In some implementations, core(s) 604 and/or graphics processor 610 may be configured to undertake any of the processes described herein including the example processes described with respect to FIGS. 2-5. Further, in response to control signals and/or microcode entry points, core(s) 604, decoder 606, display processor 608 and/or graphics processor 610 may perform corresponding operations.

Processing core(s) 604, decoder 606, display processor 608 and/or graphics processor 610 may be communicatively and/or operably coupled through a system interconnect 616 with each other and/or with various other system devices, which may include but are not limited to, for example, a memory controller 614, an audio controller 618 and/or peripherals 620. Peripherals 620 may include, for example, a unified serial bus (USB) host port, a Peripheral Component Interconnect (PCI) Express port, a Serial Peripheral Interface (SPI) interface, an expansion bus, and/or other peripherals. While FIG. 6 illustrates memory controller 614 as being coupled to decoder 606 and the processors 608 and 610 by interconnect 616, in various implementations, memory controller 614 may be directly coupled to decoder 606, display processor 608 and/or graphics processor 610.

In some implementations, system 600 may communicate with various I/O devices not shown in FIG. 6 via an I/O bus (also not shown). Such I/O devices may include but are not limited to, for example, a universal asynchronous receiver/transmitter (UART) device, a USB device, an I/O expansion interface or other I/O devices. In various implementations, system 600 may represent at least portions of a system for undertaking mobile, network and/or wireless communications.

System 600 may further include memory 612. Memory 612 may be one or more discrete memory components such as a dynamic random access memory (DRAM) device, a static random access memory (SRAM) device, flash memory device, or other memory devices. While FIG. 6 illustrates memory 612 as being external to processor 602, in various implementations, memory 612 may be internal to processor 602. Memory 612 may store instructions and/or data represented by data signals that may be executed by the processor 602. In some implementations, memory 612 may include a system memory portion and a display memory portion. Further, in various implementations, the display memory may include one or more frame buffers to store memory surfaces.

The systems described above, and the processing performed by them as described herein, may be implemented in hardware, firmware, or software, or any combination thereof. In addition, any one or more features disclosed herein may be implemented in hardware, software, firmware, and combinations thereof, including discrete and integrated circuit logic, application specific integrated circuit (ASIC) logic, and microcontrollers, and may be implemented as part of a domain-specific integrated circuit package, or a combination of integrated circuit packages. The term software, as used herein, refers to a computer program product including a computer readable medium having computer program logic stored therein to cause a computer system to perform one or more features and/or combinations of features disclosed herein.

Figure 7:
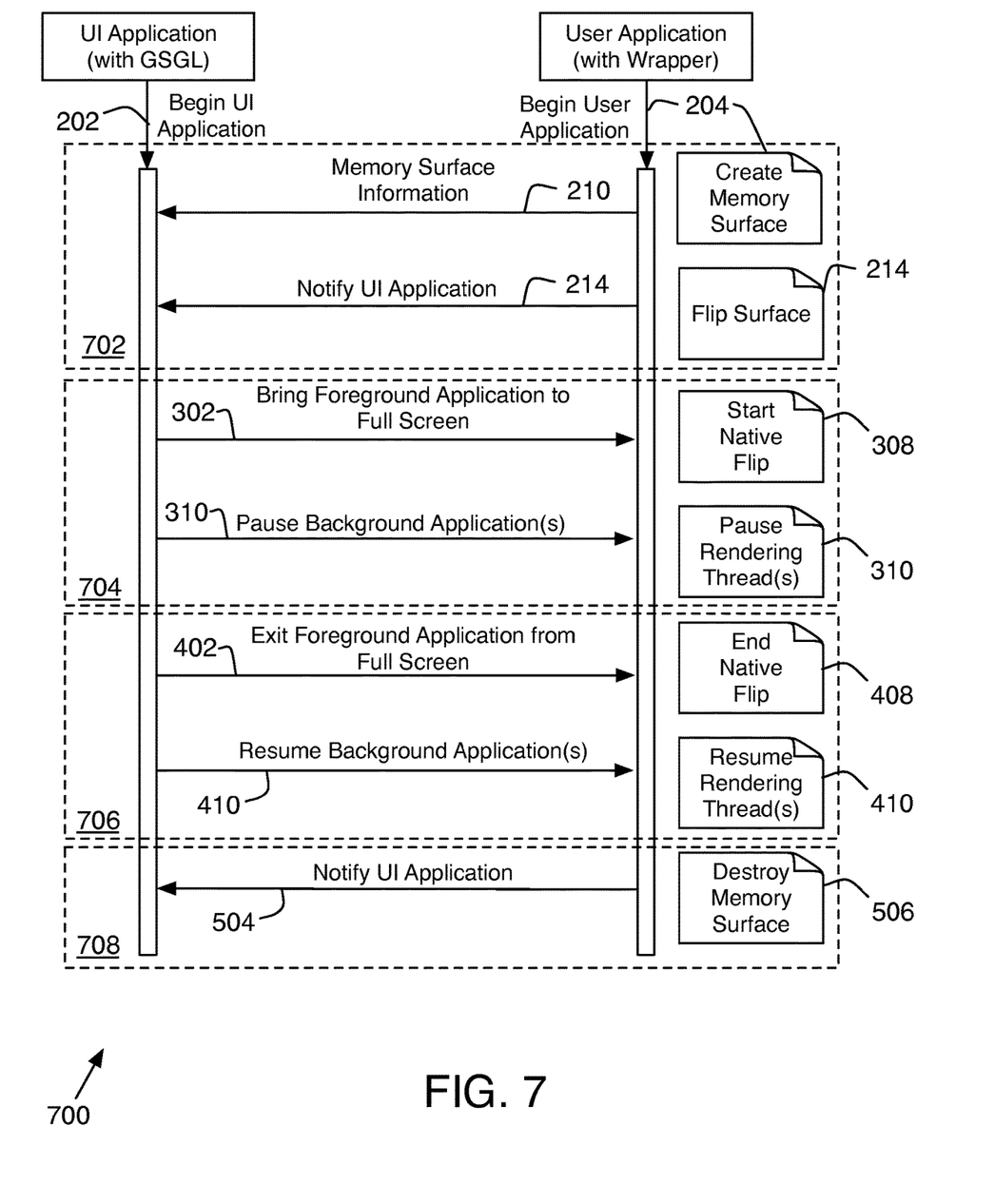
FIG. 7 illustrates an example process, all arranged in accordance with at least some implementations of the present disclosure.

FIG. 7 illustrates a flow diagram of an example process 700 for full screen application processing in a multi-application environment according to various implementations of the present disclosure. While, by way of non-limiting example, process 700 will be described herein in the context of example MAF environment 100 of FIG. 1 and/or the processes of FIGS. 2-5, those skilled in the art will recognize that process 700 may be implemented in various other execution environments and/or other processes.

Process 700 may begin at block 702 with the determination of a foreground application and at least one background application from among multiple graphics applications executing in an execution environment. For example, referring also to process 200 of FIG. 2, block 702 may include at least the following operations, functions or actions: beginning a UI application and waiting for memory surface information (block 202); beginning a rendering application and allocating a rendering surface from an API library (block 204); providing rendering application information including memory surface information to a graph library (block 210); and, intercepting a flip call made by the rendering application and notifying the graph library that the flip call has been intercepted (block 214). Although not illustrated in FIG. 7, block 702 may also include detecting the underlying memory surface allocated to the rendering application. In addition, when providing rendering application information including memory surface information to a graph library, block 702 may also include using a wrapper or agent associated with the foreground application to provide the application information to the graph library.

Process 700 may continue at block 704 with the provision of pixel data rendered by the foreground application while pausing a rendering thread of the background application. For example, referring also to process 300 of FIG. 3, block 704 may include at least the following operations, functions or actions: bringing the rendering application to foreground for full screen display (block 302); performing a native flip for the foreground application rendering process (block 308); and, pausing rendering process(es) of the background application(s) (block 310). Although not illustrated in FIG. 7, block 704 may also include obtaining application information for the foreground application(s) and notifying corresponding wrappers.

Process 700 may continue at block 706 with the ending or disabling of the native flip for the rendering process of the foreground application and the resumption of the rendering thread(s) or process(es) of the background application(s). For example, referring also to process 400 of FIG. 4, block 706 may include at least the following operations, functions or actions: the return of the foreground application to background rendering (block 402) by exiting the foreground application from full screen rendering; disabling native flip for foreground application rendering process (block 408); and, resumption of the rendering process(es) of background application(s) (block 410). Although not illustrated in FIG. 7, block 706 may also include obtaining application information from the application registry and notifying corresponding wrappers.

Process 700 may end at block 708 with the ending or of the foreground or rendering application. For example, referring also to process 500 of FIG. 5, block 708 may include at least the following operations, functions or actions: providing notice to the UI application that the memory surface allocated to the foreground application has been destroyed (block 504); and, the corresponding updating of memory surface information (block 506).

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

What is claimed:

1. A method, comprising:
at one or more processor cores,
determining, for a plurality of graphics applications executing within an execution environment, a foreground application and at least one background application;
providing pixel data rendered by the foreground application in the execution environment; and
pausing rendering processes of the background application while continuing rendering processes of the foreground application to provide the pixel data in response to an instruction to perform a switch between rendering to a foreground and rendering to a background.

2. The method of claim 1, wherein the pixel data comprises pixel data rendered for full screen display by the execution environment.

3. The method of claim 1, wherein determining a foreground application comprises intercepting a flip call.

4. The method of claim 1, wherein providing the pixel data comprises performing a native flip for a rendering process of the foreground application.

5. The method of claim 4, further comprising:
disabling the native flip for the rendering process of the foreground application; and
resuming the rendering processes of the background application.

6. The method of claim 1, wherein determining a foreground application comprises providing information associated with the foreground application to an application registry.

7. The method of claim 1, wherein determining a foreground application comprises detecting an underlying memory surface.

8. The method of claim 7, wherein determining a foreground application comprises providing information associated with the memory surface to a graph library.

9. The method of claim 8, wherein providing information associated with the memory surface to the graph library comprises using an agent associated with the foreground application to provide information associated with the memory surface to the graph library.

10. A system, comprising:
memory to store a plurality of graphics applications; and
one or more processor cores coupled to the memory, wherein the one or more processor cores are configured to determine, for the plurality of graphics applications, a foreground application and at least one background application, to provide pixel data rendered by the foreground application, and, while continuing rendering processes of the foreground application to provide the pixel data, to pause rendering processes of the background application in response to an instruction to perform a switch between rendering to a foreground and rendering to a background.

11. The system of claim 10, wherein each graphics application comprises a graphics wrapper, and wherein the one or more processor cores are configured to determine the foreground application in response to information received from a graphics wrapper of the foreground application.

12. The system of claim 11, wherein information received from the graphics wrapper of the foreground application comprises memory surface information.

13. The system of claim 10, wherein the one or more processor cores are configured to determine a foreground application by intercepting a flip call.

14. The system of claim 10, wherein the one or more processor cores are configured to provide the pixel data by performing a native flip for a rendering process of the foreground application.

15. An article comprising a computer program product having stored therein instructions that, if executed, result in:
at one or more processor cores,
determining, for a plurality of graphics applications executing within an execution environment, a foreground application and at least one background application;

providing pixel data rendered by the foreground application in the execution environment; and pausing rendering processes of the background application while continuing rendering processes of the foreground application to provide the pixel data application in response to an instruction to perform a switch between rendering to a foreground and rendering to a background.

16. The article of claim 15, wherein instructions for determining a foreground application include instructions for intercepting a flip call.

17. The article of claim 15, wherein instructions for providing the pixel data include instructions for performing a native flip for a rendering process of the foreground application.

18. The article of claim 15, wherein instructions for determining a foreground application include instructions for detecting an underlying memory surface.

19. The article of claim 18, wherein instructions for determining a foreground application include instructions for providing information associated with the memory surface to a graph library.

20. The article of claim 19, wherein instructions for providing information associated with the memory surface to the graph library include instructions for using an agent associated with the foreground application to provide information associated with the memory surface to the graph library.

* * * * *

UNITED STATES PATENT AND TRADEMARK OFFICE
CERTIFICATE OF CORRECTION

| | | |
|---|---|---|
| PATENT NO. | : 10,748,233 B2 | Page 1 of 1 |
| APPLICATION NO. | : 13/578355 | |
| DATED | : August 18, 2020 | |
| INVENTOR(S) | : Tao Zhao, John C. Weast and Brett P. Wang | |

It is certified that error appears in the above-identified patent and that said Letters Patent is hereby corrected as shown below:

On the Title Page

Item [22], Replace "Jun. 11, 2011" with --Jun. 14, 2011--

Signed and Sealed this
Third Day of November, 2020

Andrei Iancu
*Director of the United States Patent and Trademark Office*